US008646988B2

(12) United States Patent
Katagiyama et al.

(10) Patent No.: US 8,646,988 B2
(45) Date of Patent: Feb. 11, 2014

(54) OPTICAL CONNECTOR ADAPTER WITH EXCELLENT DUST RESISTANCE

(75) Inventors: Naoki Katagiyama, Tokyo (JP); Yuichi Koreeda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 229 days.

(21) Appl. No.: 12/927,173

(22) Filed: Nov. 9, 2010

(65) Prior Publication Data

US 2011/0158586 A1     Jun. 30, 2011

(30) Foreign Application Priority Data

Dec. 28, 2009   (JP) .................. 2009-298145

(51) Int. Cl.
G02B 6/38         (2006.01)
(52) U.S. Cl.
USPC ............................................. 385/55
(58) Field of Classification Search
None
See application file for complete search history.

(56) References Cited

U.S. PATENT DOCUMENTS

| 5,774,611 | A |   | 6/1998 | Nagase et al. |         |
|-----------|---|---|--------|---------------|---------|
| 5,887,095 | A | * | 3/1999 | Nagase et al. | 385/58  |
| 6,431,762 | B1| * | 8/2002 | Taira et al.  | 385/56  |
| 2004/0223701 | A1 |   | 11/2004 | Tanaka et al. |         |

FOREIGN PATENT DOCUMENTS

| EP | 0 788 002   | 8/1997 |
|----|-------------|--------|
| JP | 8-248263    | 9/1996 |
| JP | 9-211264    | 8/1997 |
| JP | 2001-033658 | 2/2001 |
| JP | 2003-270489 | 9/2003 |

OTHER PUBLICATIONS

Chinese Office Action dated Jan. 10, 2013 in Chinese Application No. CN 201010568215.5 with English translation.

* cited by examiner

Primary Examiner — Sarah Hahm
(74) Attorney, Agent, or Firm — Collard & Roe, P.C.

(57) ABSTRACT

Provided is an optical connector adapter of the type in which a shell-side hollow cylindrical portion is integrally formed in a shell, a sleeve holder inserted in the shell has a holder-side hollow cylindrical portion, and a sleeve is held by the shell-side cylindrical portion and the holder-side cylindrical portion. The shell has an inward engaging projection on the inner periphery thereof at its portions facing the holder-side cylindrical portion while the sleeve holder has a holder locking portion. By engaging the holder locking portion with the engaging projection, the sleeve holder is prevented from being removed from the shell. The optical connector adapter is attached to a housing so as to pass through its wall such that the shell-side cylindrical portion is located outside the housing while the holder-side cylindrical portion is located inside the housing.

8 Claims, 8 Drawing Sheets form each other in an axial direction of the

OPTICAL CONNECTOR ADAPTER WITH EXCELLENT DUST RESISTANCE

This application is based upon and claims the benefit of priority from Japanese patent application No. 2009-298145, filed on Dec. 28, 2009, the disclosure of which is incorporated herein in its entirely by reference.

TECHNICAL FIELD

This invention relates to an adapter for use in connecting optical connectors to each other. Hereinafter, such an adapter will be referred to as an "optical connector adapter".

BACKGROUND ART

In general, an optical connector comprises a ferrule which is bonded to an end portion of an optical fiber. Normally, in order to achieve optical connection using two optical connectors of this type, ferrules of the optical connectors are brought into contact with each other in an axial direction thereof. In this case, in order to ensure the stable contact between the ferrules, use is made of an optical connector adapter comprising a tubular member generally called a split sleeve which has an axial slit extending along the entire length thereof. Specifically, the ferrules are inserted into the split sleeve from its axial ends, respectively, so that the ferrules are brought into contact with each other in the sleeve. As a result, optical connection between optical fibers is obtained. Hereinafter, such a split sleeve will be simply referred to as a "sleeve".

This type of optical connector adapter is disclosed in, for example, JP-A-2003-270489 (Patent Document 1) or JP-A-2001-33658 (Patent Document 2), wherein one axial part of a sleeve is held by a shell-side hollow cylindrical portion integrally formed in a shell while the other axial part of the sleeve is held by a holder-side hollow cylindrical portion of a sleeve holder inserted in the shell. The sleeve holder is prevented from being detached from the shell by the use of holes formed through the shell.

SUMMARY OF THE INVENTION

However, with the holes formed through the shell, the sealability of the shell is reduced so that there is a possibility of foreign matter such as dust entering the shell through gaps due to the holes.

Since the shell-side cylindrical portion is integrally formed with the shell, it is relatively easy to prevent the foreign matter from entering the sleeve. In contrast, since the holder-side cylindrical portion is formed separately from the shell, it is not easy to prevent the foreign matter from entering the sleeve through gaps between the holder-side cylindrical portion and the shell.

It is needless to say that the foreign matter such as the dust entering the sleeve of the optical connector adapter causes an increase in optical connection loss between optical connectors.

It is therefore an exemplary object of this invention to provide an optical connector adapter with high reliability which is achieved by ensuring excellent dust resistance and preventing unintentional disengagement of a component.

Other objects of the present invention will become clear as the description proceeds.

According to an exemplary aspect of the present invention, there is provided an optical connector adapter comprising a shell which has an inner periphery, a shell-side hollow cylindrical portion which is formed integral with the shell, a sleeve holder which is inserted inside the shell and comprises a holder-side hollow cylindrical portion, and a sleeve which is placed inside the shell and comprises a first and a second part which are different form each other in an axial direction of the sleeve, wherein the first and the second parts are fitted in the shell-side and the holder-side hollow cylindrical portions, respectively, wherein the shell comprises an engaging projection which projects from the inner periphery inwardly, wherein the sleeve holder comprises a holder locking portion which engages with the engaging projection in the axial direction to prevent removing of the sleeve holder from the shell, and wherein the optical connector adapter is capable of being attached to a wall of a housing so as to pass through the wall such that the shell-side hollow cylindrical portion is located outside the housing while the holder-side hollow cylindrical portion is located inside the housing.

According to another exemplary aspect of the present invention, there is provided an electronic device comprising a housing comprising a wall and an optical connector adapter attached to the housing 2 so as to pass through the wall, wherein the optical connector adapter comprises a shell which has an inner periphery, a shell-side hollow cylindrical portion which is formed integral with the shell, a sleeve holder which is inserted inside the shell and comprises a holder-side hollow cylindrical portion, and a sleeve which is placed inside the shell and comprises a first and a second part which are different form each other in an axial direction of the sleeve, wherein the first and the second parts are fitted in the shell-side and the holder-side hollow cylindrical portions, respectively, wherein the shell comprises an engaging projection which projects from the inner periphery inwardly, wherein the sleeve holder comprises a holder locking portion which engages with the engaging projection in the axial direction to prevent removing of the sleeve holder from the shell, and wherein the shell-side hollow cylindrical portion is located outside the housing while the holder-side hollow cylindrical portion is located inside the housing.

EXEMPLARY EMBODIMENT

In order to facilitate understanding of this invention, description will first be made as regards two related arts with reference to FIGS. 1 and 2.

Figure 1:
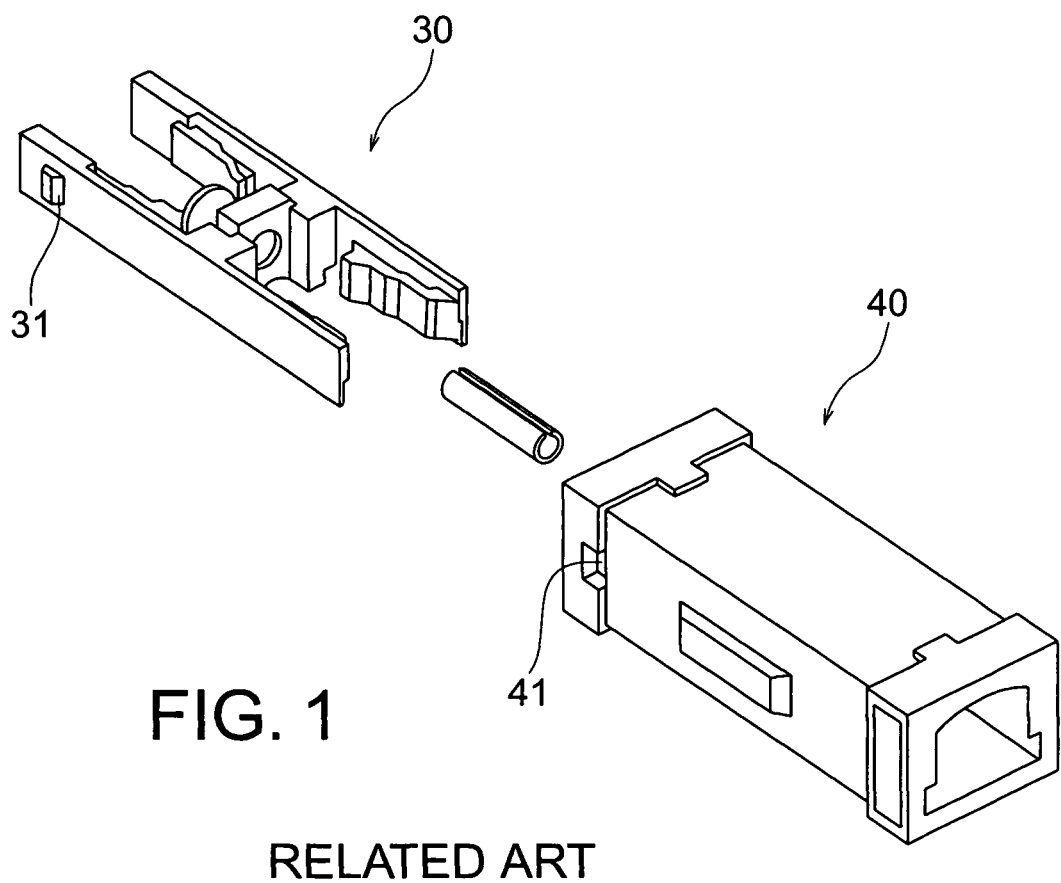
FIG. 1 is an exploded perspective view showing a prior art optical connector adapter.

FIG. 1 is an exploded perspective view of an optical connector adapter described in Patent Document 1 referred to above. In this optical connector adapter, a sleeve holder 30 is locked to a housing 40 by engaging locking projections 31 of the sleeve holder 30 with locking holes 41 formed through the housing 40. In this case, there is a problem that since the locking holes 41 are through-holes, foreign matter such as dust tends to enter the housing 40.

Figure 2:
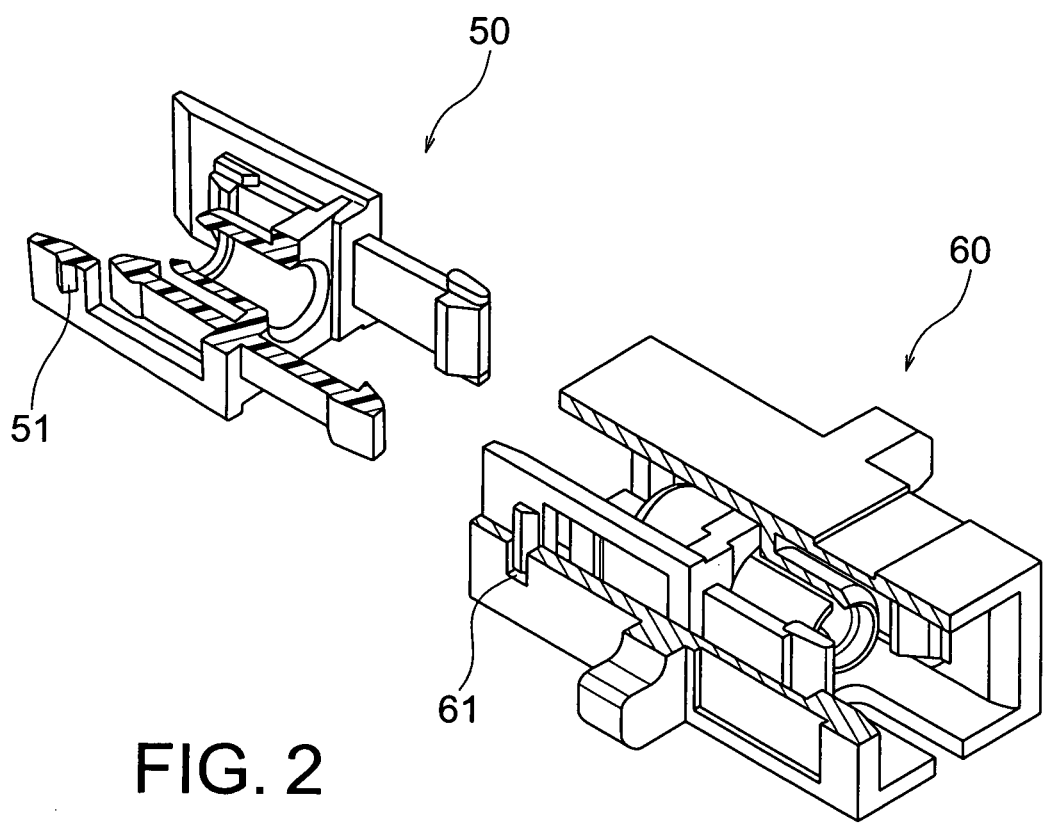
FIG. 2 is an exploded perspective view, partially cut away, showing another prior art optical connector adapter.

FIG. 2 is an exploded perspective view of an optical connector adapter described in Patent Document 2 referred to above. In this optical connector adapter, a sleeve holder 50 is locked to a housing 60 by engaging locking projections 51 of the sleeve holder 50 with locking holes 61 formed through the housing 60. Also in this case, there is a problem that since the locking holes 61 are through-holes, foreign matter such as dust tends to enter the housing 60.

Further, since the housing is made of plastic, wear debris tends to be generated due to rubbing with a ceramic ferrule when attaching or detaching an optical connector. This also behaves as dust to reduce the reliability of optical connection.

Moreover, in the optical connector adapter of FIG. 1 or 2, there is also a problem that the locking projections 31 or 51 of the sleeve holder 30 or 50 tend to be disengaged from the locking holes 41 or 61 of the housing 40 or 60 due to movement of the locking projections 31 or 51 along with the sleeve holder 30 or 50 when attaching or detaching an optical connector.

Figure 3:
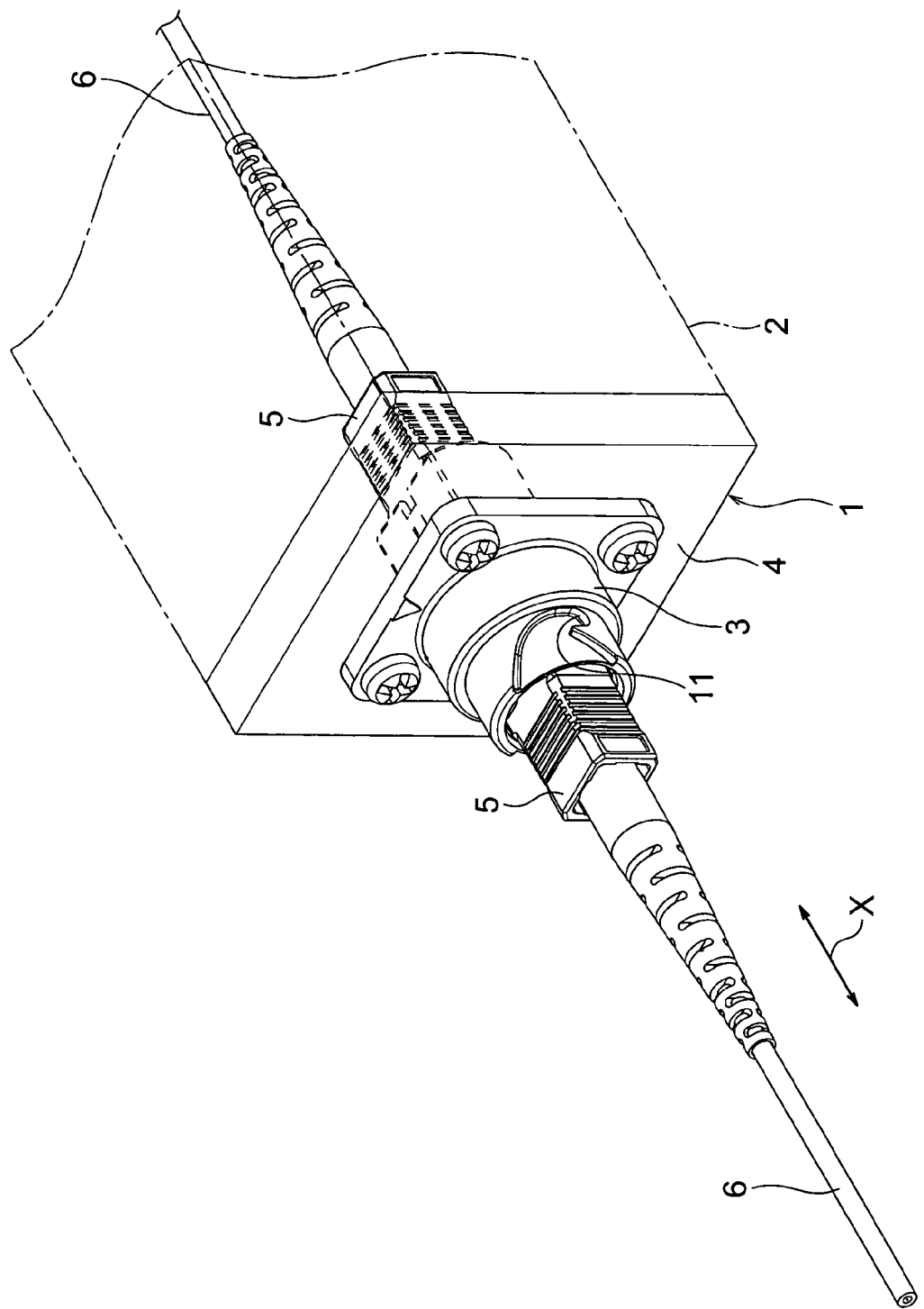
FIG. 3 is an external perspective view showing a state where optical cables are connected, using optical connectors, to an optical connector adapter of an electronic device according to an exemplary embodiment of this invention.
Figure 4:
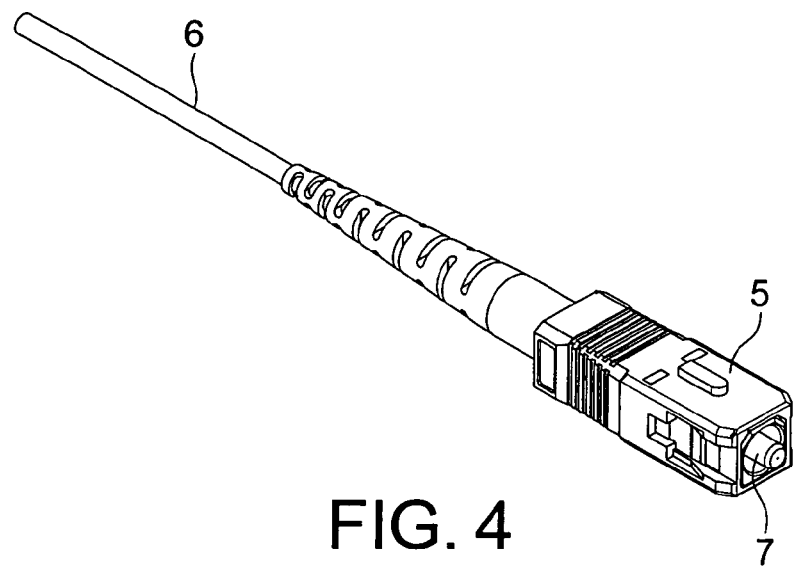
FIG. 4 is an external perspective view showing one of the optical connectors used in FIG. 3 in a state where the optical cable is connected thereto.
Figure 5:
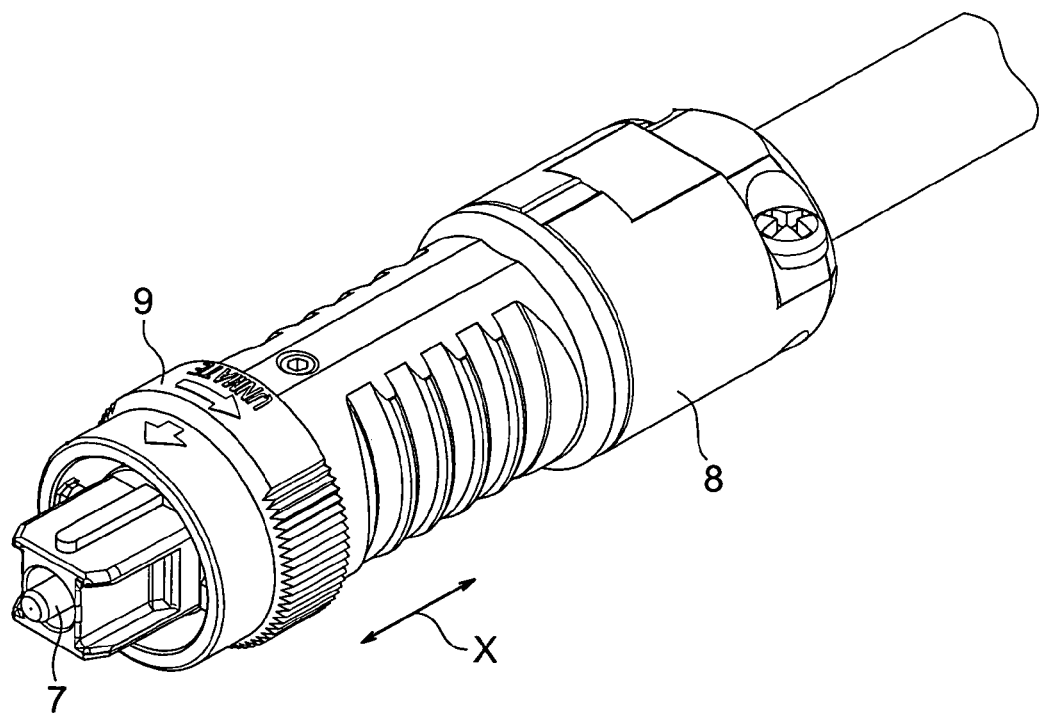
FIG. 5 is an external perspective view showing another example of an optical connector in a state where an optical cable is connected thereto.

Referring now to FIGS. 3 to 5, the description will be made as regards the outline of an electronic device 1 according to an embodiment of this invention.

In FIG. 3, the electronic device 1 includes a housing 2 and an optical connector adapter 3 attached to the housing 2 so as to pass through its wall 4. Optical connectors 5 are inserted into the optical connector adapter 3 from the inside and the outside of the housing 2, respectively. An optical cable 6 is connected to each optical connector 5 in advance. The optical connector adapter 3 will be described in detail later.

As shown in FIG. 4, the optical connector 5 has a ceramic ferrule 7 at its front end. An optical fiber of the optical cable 6 is bonded to the ferrule 7. The two optical connectors 5 inserted into the optical connector adapter 3 are brought into contact with each other in an axial direction X inside the optical connector adapter 3 so that optical connection between the optical cables 6 is obtained.

Instead of the optical connector 5 shown in FIG. 4, an optical connector 8 of another type shown in FIG. 5 can be connected to the optical connector adapter 3. The optical connector 8 of FIG. 5 can be engaged with and disengaged from an engaging groove 11 of the optical connector adapter 3 by rotating its operating ring 9.

In an optical connector adapter of the type that is used by being attached to a housing, the number of times of attaching and detaching an optical connector inside the housing (internal wiring) is small while an optical connector outside the housing is frequently attached and detached. In view of this, there is employed a structure which will be described in detail hereinbelow, wherein a shell of an optical connector adapter has a sealed structure to prevent the entrance of dust, a sleeve holder is prevented from being disengaged from the shell when attaching, i.e. inserting, or detaching, i.e. pulling out, an optical connector located on the outside, and further, the shell is made of metal to thereby prevent the generation of dust when attaching or detaching the optical connector.

Referring now to FIGS. 6A to 11 in addition to FIG. 3, the optical connector adapter 3 will be described in detail.

The illustrated optical connector adapter 3 comprises a metal shell 12, a shell-side hollow cylindrical portion 13 which is integrally formed with the shell 12 via an internal partition wall 12a inside the shell 12, a metal sleeve 14 for optical connection whose one axial part, namely, a first part in the axial direction X is held by the shell-side cylindrical portion 13, and a resin sleeve holder 15 detachably inserted in the shell 12. The sleeve 14 is a tubular member generally called a split sleeve which has an axial slit extending along the entire length thereof. The shell-side hollow cylindrical portion 13 is opened at opposite ends in the axial direction X.

The sleeve holder 15 has a holder-side hollow cylindrical portion 16 holding a second part, namely, the other axial part of the sleeve 14. The shell-side cylindrical portion 13 extends from the internal partition wall 12a in the axial direction X so as to be fitted over the outer periphery of the one axial part of the sleeve 14 while the holder-side cylindrical portion 16 extends from a holder base portion 15a coaxially with the shell-side cylindrical portion 13 so as to be fitted over the outer periphery of the other axial part of the sleeve 14. That is, the sleeve 14 is received in the two hollow cylindrical portions 13 and 16 that are coaxially coupled to each other. The holder-side cylindrical portion 16 is also opened at opposite ends in the axial direction X.

The shell 12 is formed with the above-mentioned engaging groove 11 on the outer periphery thereof at its axial end portion located outside the housing 2. On the inner periphery of the shell 12, a pair of inward engaging projections 21 facing each other in a diameter direction thereof is formed at its portions facing the holder-side cylindrical portion 16.

The sleeve holder 15 further has a pair of holder locking portions 22 in the form of elastic beams facing each other in a diameter direction thereof. The holder locking portions 22 engage the engaging projections 21 in the axial direction X, thereby preventing disengagement of the sleeve holder 15 from the shell 12. Even if a force directed in the axial direction X is applied to the sleeve holder 15 when attaching the optical connector 5, since the holder locking portions 22 are urged outward, there is little possibility of the holder locking portions 22 being disengaged from the engaging projections 21. Further, since the engaging projections 21 are formed on the inner periphery of the shell 12, there is no possibility of deformation or damage to the engaging projections 21 due to a load from the outside of the shell 12.

The sleeve holder 15 further has a pair of outer connector locking portions 23 for engaging the optical connector 5 located outside the housing 2 to thereby prevent disengagement thereof and a pair of inner connector locking portions 24 for engaging the optical connector 5 located inside the housing 2 to thereby prevent disengagement thereof. The outer connector locking portions 23 and the inner connector locking portions 24 extend like cantilevers from the holder base portion 15a in mutually opposite directions along the axial direction X. The outer connector locking portions 23 extend through through-holes 12b formed in the internal partition wall 12a of the shell 12.

The holder locking portions 22 are each in the form of a cantilever that extends from the holder base portion 15a in the axial direction X and outward toward the inner periphery of the shell 12. Therefore, the holder locking portions 22 are elastically deformable independently of the inner connector locking portions 24.

Figure 6A:
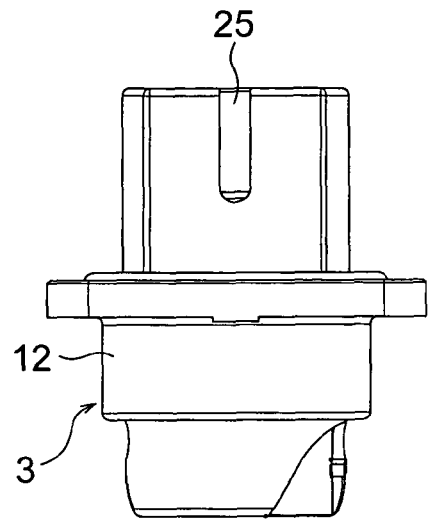
FIG. 6A is a plan view of the optical connector adapter used in FIG. 3.
Figure 6B:
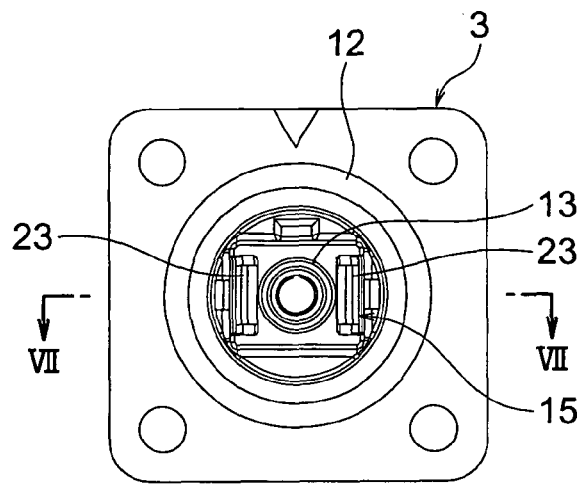
FIG. 6B is a front view of FIG. 6A.
Figure 6C:
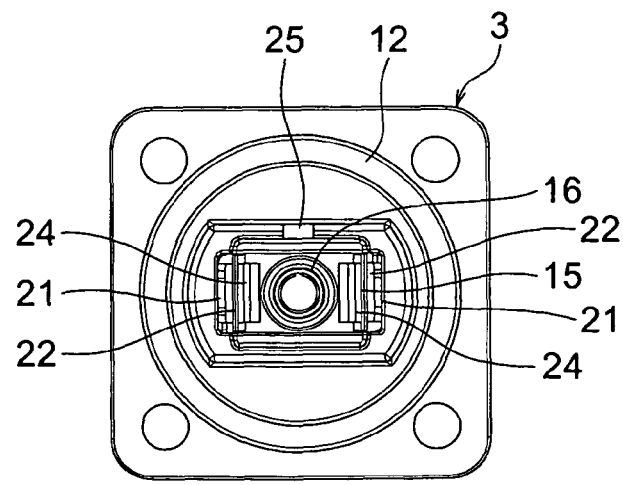
FIG. 6C is a rear view of FIG. 6A.
Figure 7:
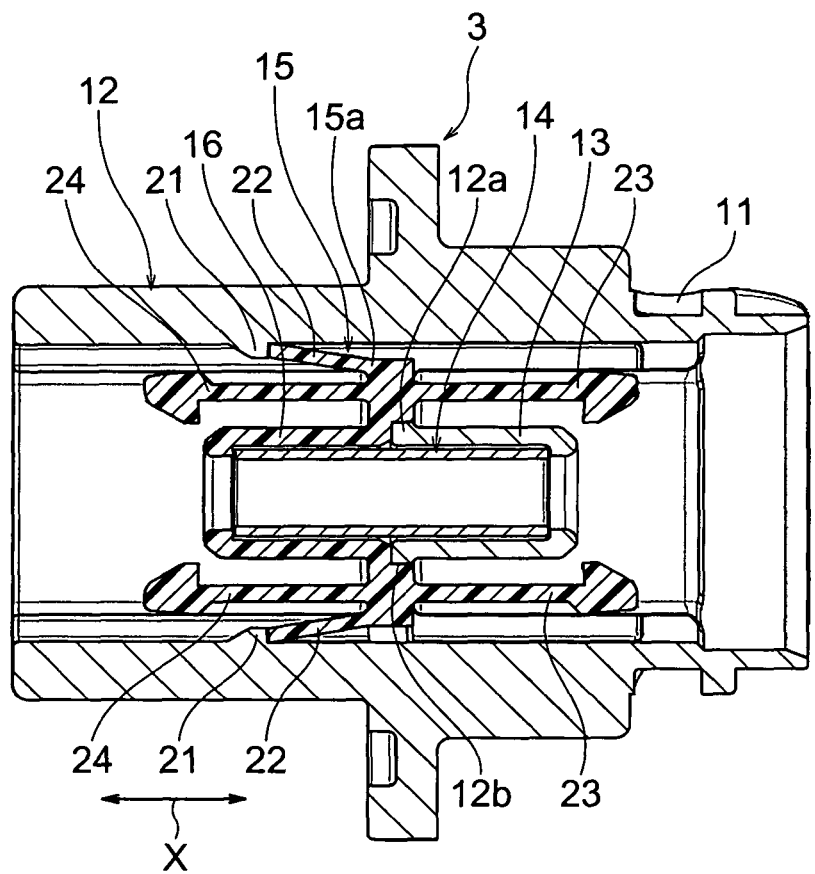
FIG. 7 is an enlarged sectional view taken along line V-V of FIG. 6B.
Figure 8:
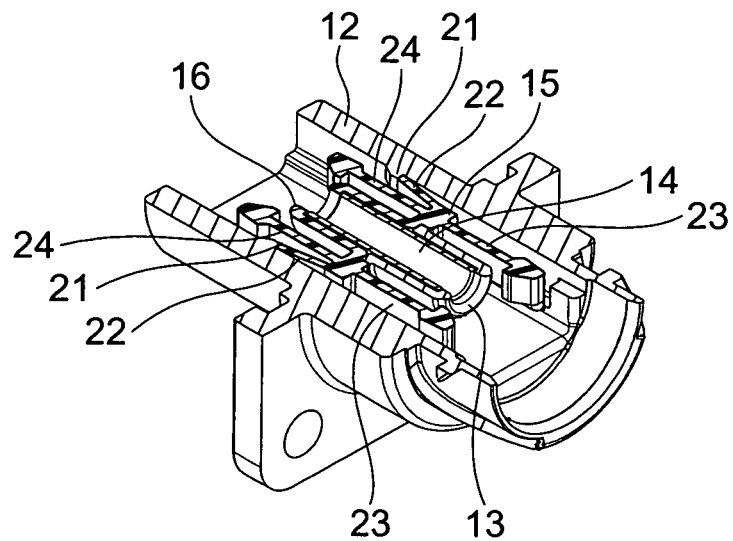
FIG. 8 is a sectional perspective view taken along line V-V of FIG. 6B.

As seen from FIGS. 6B and 6C, the engaging projections 21, the holder locking portions 22, the outer connector locking portions 23, and the inner connector locking portions 24 are all disposed with a position offset of 90 degrees with respect to a key groove 25 that defines the direction of the optical connector 5 when attaching or detaching it.

In the case where the holder locking portions 22 with the same shape as that shown in the figures are disposed in the same direction as that of the key groove 25, since the thickness of the holder base portion 15a is thin, when an axial load is applied to the holder locking portions 22, the holder locking portions 22 tend to be deformed because of poor strength of the holder base portion 15a. If the width of the holder locking portions 22 is increased for solving this problem, the cost increases due to an increase in the amount of material.

In this embodiment, since the position of the key groove 25 is offset by 90 degrees, the locking structure can be obtained with a minimum amount of material. Further, in assembly, since the elastic cantilever portions (the holder locking portions 22, the outer connector locking portions 23, and the inner connector locking portions 24) are aligned in the same direction, it is possible to grasp the sides of the holder-side cylindrical portion 16 when holding the sleeve holder 15 and thus it is possible to prevent deformation or damage to the elastic cantilever portions (the holder locking portions 22, the outer connector locking portions 23, and the inner connector locking portions 24).

Figure 9:
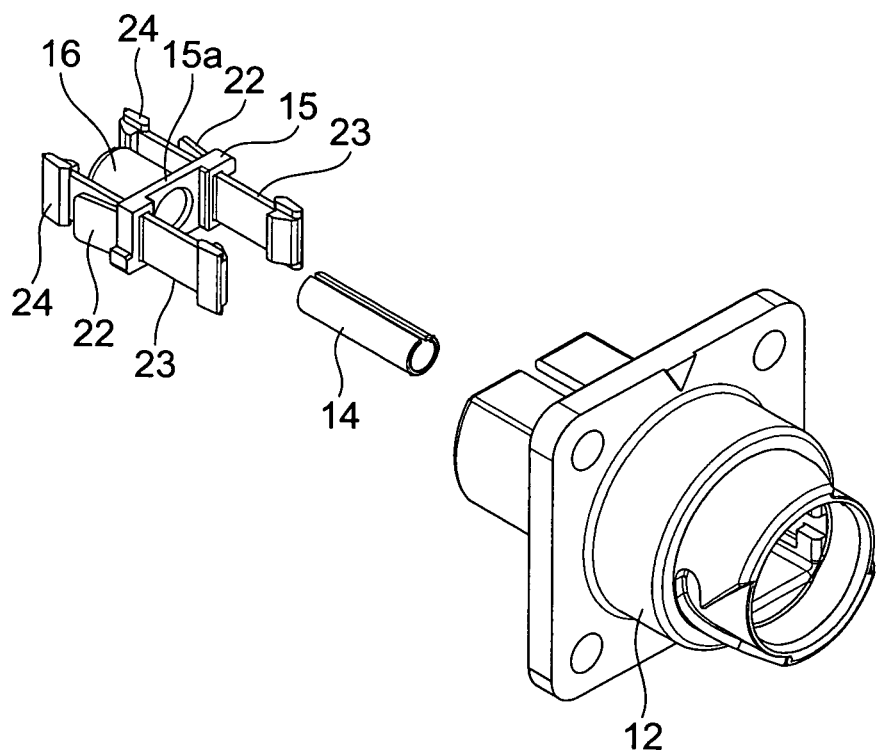
FIG. 9 is an exploded perspective view of the optical connector adapter used in FIG. 3.
Figure 10:
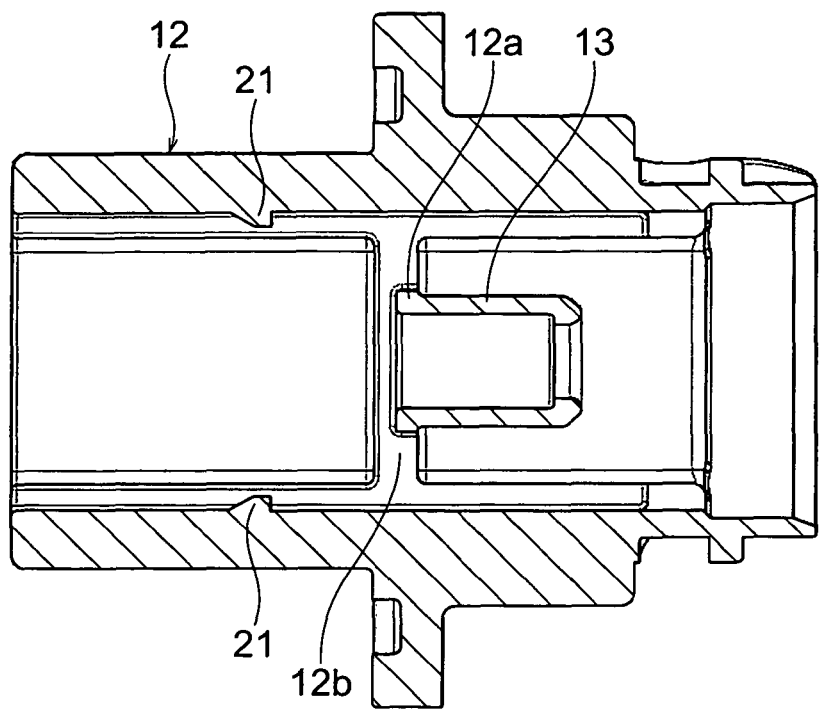
FIG. 10 is a sectional view of a shell of the optical connector adapter used in FIG. 3.
Figure 11:
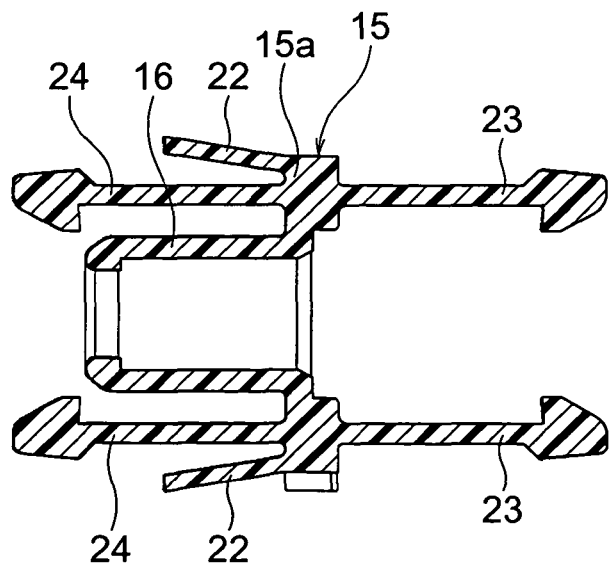
FIG. 11 is a sectional view of a sleeve holder of the optical connector adapter used in FIG. 3.

As shown in FIG. 9, the optical connector adapter 3 is composed of the component in which the shell 12 and the shell-side cylindrical portion 13 are integrally formed (see FIG. 10), the sleeve 14, and the sleeve holder 15 (see FIG. 11), i.e. three components in total. This optical connector adapter 3 is attached to the wall 4 of the housing 2 from the outside so as to pass through the wall 4 such that the shell-side cylindrical portion 13 is located outside the housing 2 while the holder-side cylindrical portion 16 is located inside the housing 2.

According to the optical connector adapter 3, since the shell-side cylindrical portion 13 integrally formed with the shell 12 is located outside the housing 2, it is relatively easy to prevent foreign matter such as dust from entering the sleeve 14 from the outside of the housing 2. In addition, since, inside the housing 2, the sleeve holder 15 is locked by the engaging projections 21 formed on the inner periphery of the shell 12, locking means passing through the shell 12 is unnecessary so that it is also possible to prevent foreign matter such as dust from entering the sleeve 14 from the inside of the housing 2. As a result, it is possible to reduce the cause of optical connection loss.

Since the shell 12 is made of metal, it is possible to prevent the generation of dust such as plastic wear debris when attaching or detaching the optical connector 5.

As described above, it is possible to provide an optical connector adapter with excellent dust resistance.

Various exemplary embodiments of this invention will be enumerated in the following items 1-7.

1. An optical connector adapter 3 comprising:
a shell 12 which has an inner periphery;
a shell-side hollow cylindrical portion 13 which is formed integral with the shell 12;
a sleeve holder 15 which is inserted inside the shell 12 and comprises a holder-side hollow cylindrical portion 16; and
a sleeve 14 which is placed inside the shell 12 and comprises a first and a second part which are different form each other in an axial direction X of the sleeve 14;
wherein the first and the second parts are fitted in the shell-side and the holder-side hollow cylindrical portions 13 and 16, respectively,
wherein the shell 12 comprises an engaging projection 21 which projects from the inner periphery inwardly,
wherein the sleeve holder 15 comprises a holder locking portion 22 which engages with the engaging projection 21 in the axial direction X to prevent removing of the sleeve holder 15 from the shell 12, and
wherein the optical connector adapter 3 is capable of being attached to a wall 4 of a housing 2 so as to pass through the wall 4 such that the shell-side hollow cylindrical portion 13 is located outside the housing 2 while the holder-side hollow cylindrical portion 16 is located inside the housing 2.

2. The optical connector adapter 3 according to item 1, wherein the holder locking portion 22 is in the form of a cantilever that extends in the axial direction X and outward toward the inner periphery of the shell 12.

3. The optical connector adapter 3 according to item 2, wherein the sleeve holder 15 has an inner connector locking portion 24 for engaging an inner optical connector 5 located inside the housing 2 to thereby prevent removing of the inner optical connector 5, and the holder locking portion 22 is elastically deformable independently of the inner connector locking portion 24.

4. The optical connector adapter 3 according to item 3, wherein the sleeve holder has an outer connector locking portion 23 for engaging an outer optical connector 5 located outside the housing 1 to thereby prevent removing of the outer optical connector 5, and the inner connector locking portion 24 and the outer connector locking portion 23 extend like cantilevers in mutually opposite directions along the axial direction X.

5. The optical connector adapter 3 according to item 1, wherein the shell 12 is made of at least one of a metal and a resin.

6. An electronic device 1 comprising:
a housing 2 comprising a wall 4; and an optical connector adapter 3 attached to the housing 2 so as to pass through the wall 4,
wherein the optical connector adapter 3 comprises:
a shell 12 which has an inner periphery;
a shell-side hollow cylindrical portion 13 which is formed integral with the shell 12;
a sleeve holder 15 which is inserted inside the shell 12 and comprises a holder-side hollow cylindrical portion 16; and
a sleeve 14 which is placed inside the shell 12 and comprises a first and a second part which are different form each other in an axial direction X of the sleeve 14;
wherein the first and the second parts are fitted in the shell-side and the holder-side hollow cylindrical portions 13 and 16, respectively,
wherein the shell 12 comprises an engaging projection 21 which projects from the inner periphery inwardly,
wherein the sleeve holder 15 comprises a holder locking portion 22 which engages with the engaging projection 21 in the axial direction X to prevent removing of the sleeve holder 15 from the shell 12, and
wherein the shell-side hollow cylindrical portion 13 is located outside the housing 12 while the holder-side hollow cylindrical portion 16 is located inside the housing.

7. The electronic device according to item 6, further comprising two optical connectors 5 which are inserted into the optical connector adapter 3 from an inside of the housing 2 and an outside of the housing 2, respectively.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical connector adapter comprising:
   a shell which has an inner periphery;
   a shell-side hollow cylindrical portion which is formed integral with the shell;
   a sleeve holder which is inserted inside the shell and comprises a holder-side hollow cylindrical portion; and
   a sleeve which is placed inside the shell and comprises a first and a second part which are different from each other in an axial direction of the sleeve;
   wherein the first and the second parts are fitted in the shell-side and the holder-side hollow cylindrical portions, respectively,
   wherein the shell comprises an engaging projection which projects from the inner periphery inwardly,
   wherein the sleeve holder comprises a holder locking portion which is in the form of a cantilever and extends in the axial direction and outward toward the inner periphery of the shell,
   wherein the holder locking portion is elastically deformable and engages with the engaging projection in the axial direction to prevent removing of the sleeve holder from the shell, and
   wherein the optical connector adapter is capable of being attached to a wall of a housing so as to pass through the wall such that the shell-side hollow cylindrical portion is located outside the housing while the holder-side hollow cylindrical portion is located inside the housing.

2. The optical connector adapter according to claim 1, wherein the sleeve holder has an inner connector locking portion for engaging an inner optical connector located inside the housing to thereby prevent removing of the inner optical connector, and the holder locking portion is elastically deformable independently of the inner connector locking portion.

3. The optical connector adapter according to claim 2, wherein the sleeve holder has an outer connector locking portion for engaging an outer optical connector located outside the housing to thereby prevent removing of the outer optical connector, and the inner connector locking portion and the outer connector locking portion extend like cantilevers in mutually opposite directions along the axial direction.

4. The optical connector adapter according to claim 1, wherein the shell is made of at least one of a metal and a resin.

5. An electronic device comprising:
   a housing comprising a wall; and
   an optical connector adapter attached to the housing so as to pass through the wall,
   wherein the optical connector adapter comprises:
   a shell which has an inner periphery;
   a shell-side hollow cylindrical portion which is formed integral with the shell;
   a sleeve holder which is inserted inside the shell and comprises a holder-side hollow cylindrical portion; and
   a sleeve which is placed inside the shell and comprises a first and a second part which are different from each other in an axial direction of the sleeve;
   wherein the first and the second parts are fitted in the shell-side and the holder-side hollow cylindrical portions, respectively,
   wherein the shell comprises an engaging projection which projects from the inner periphery inwardly,
   wherein the sleeve holder comprises a holder locking portion which is in the form of a cantilever and extends in the axial direction and outward toward the inner periphery of the shell,
   wherein the holder locking portion is elastically deformable and engages with the engaging projection in the axial direction to prevent removing of the sleeve holder from the shell, and
   wherein the shell-side hollow cylindrical portion is located outside the housing while the holder-side hollow cylindrical portion is located inside the housing.

6. The electronic device according to claim 5, further comprising two optical connectors which are inserted into the optical connector adapter from an inside of the housing and an outside of the housing, respectively.

7. An optical connector adapter comprising:
   a shell which has an inner periphery;
   a shell-side hollow cylindrical portion which is formed integral with the shell;
   a sleeve holder which is inserted inside the shell and comprises a holder-side hollow cylindrical portion; and
   a sleeve which is placed inside the shell and comprises a first and a second part which are different from each other in an axial direction of the sleeve;
   wherein the first and the second parts are fitted in the shell-side and the holder-side hollow cylindrical portions, respectively,
   wherein the shell comprises an engaging projection which projects from the inner periphery inwardly,
   wherein the sleeve holder comprises a holder locking portion which engages with the engaging projection in the axial direction to prevent removing of the sleeve holder from the shell,
   wherein the optical connector adapter is capable of being attached to a wall of a housing so as to pass through the wall such that the shell-side hollow cylindrical portion is located outside the housing while the holder-side hollow cylindrical portion is located inside the housing, and
   wherein the holder locking portion is of a plate shape and in the form of a cantilever that extends in the axial direction and outward toward the inner periphery of the shell.

8. An electronic device comprising:
   a housing comprising a wall; and
   the optical connector adapter according to claim 7, the optical connector being attached to the housing so as to pass through the wall.

* * * * *